(12) United States Patent
Diego Gutierrez et al.

(10) Patent No.: US 12,076,931 B2
(45) Date of Patent: Sep. 3, 2024

(54) DIMENSIONAL COMPENSATIONS IN ADDITIVE MANUFACTURING

(71) Applicant: Hewlett-Packard Development Company, L.P., Spring, TX (US)

(72) Inventors: Victor Diego Gutierrez, Sant Cugat del Valles (ES); Manuel Freire Garcia, Sant Cugat del Valles (ES); Enrique Gurdiel Gonzalez, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 195 days.

(21) Appl. No.: 17/417,952

(22) PCT Filed: Apr. 30, 2019

(86) PCT No.: PCT/US2019/029840
§ 371 (c)(1),
(2) Date: Jun. 24, 2021

(87) PCT Pub. No.: WO2020/222789
PCT Pub. Date: Nov. 5, 2020

(65) Prior Publication Data
US 2022/0072800 A1    Mar. 10, 2022

(51) Int. Cl.
| | | |
|---|---|---|
| B29C 64/393 | (2017.01) | |
| B22F 10/80 | (2021.01) | |
| B33Y 10/00 | (2015.01) | |
| B33Y 30/00 | (2015.01) | |
| B33Y 50/00 | (2015.01) | |
| B33Y 50/02 | (2015.01) | |
| B22F 10/14 | (2021.01) | |
| B22F 10/28 | (2021.01) | |
| B29C 64/165 | (2017.01) | |
| B29C 64/386 | (2017.01) | |

(52) U.S. Cl.
CPC ............ B29C 64/393 (2017.08); B22F 10/80 (2021.01); B33Y 10/00 (2014.12); B33Y 30/00 (2014.12); B33Y 50/00 (2014.12); B33Y 50/02 (2014.12); *B22F 10/14* (2021.01); *B22F 10/28* (2021.01)

(58) Field of Classification Search
CPC ... B29C 64/393; B29C 64/165; B29C 64/386; B22F 10/80; B22F 10/01; B22F 10/28; B33Y 10/00; B33Y 30/00; B33Y 50/00; B33Y 50/02; Y02P 10/25
USPC .......................................................... 700/119
See application file for complete search history.

(56) References Cited

U.S. PATENT DOCUMENTS

| | | |
|---|---|---|
| 6,198,549 B1 | 3/2001 | Decker et al. |
| 6,936,212 B1 | 8/2005 | Crawford |

(Continued)

FOREIGN PATENT DOCUMENTS

WO    WO-2018182589 A1    10/2018

*Primary Examiner* — Michael J Brown
(74) *Attorney, Agent, or Firm* — Michael Dryja

(57) ABSTRACT

In an example, a method includes receiving, by at least one processor, object model data representing at least a portion of a first object that is to be generated by an additive manufacturing apparatus. An indication of a proportion of the first object which is solid may be determined, and, based thereon, a dimensional compensation value may be determined. The determined dimensional compensation value may be applied to the object model data to determine modified object model data.

15 Claims, 5 Drawing Sheets

(56) References Cited

U.S. PATENT DOCUMENTS

| | | |
|---|---|---|
| 8,003,040 B2 | 8/2011 | El-Siblani |
| 2015/0197062 A1 | 7/2015 | Shinar et al. |
| 2016/0082666 A1 | 3/2016 | De Pena et al. |
| 2016/0136883 A1 | 5/2016 | Schmidt |
| 2016/0320771 A1* | 11/2016 | Huang .................... B33Y 50/00 |
| 2016/0332384 A1* | 11/2016 | De Pena ................ B33Y 50/02 |
| 2017/0368753 A1 | 12/2017 | Yang et al. |
| 2018/0009128 A1 | 1/2018 | Sokol et al. |
| 2018/0322621 A1 | 11/2018 | Craeghs et al. |
| 2019/0054700 A1 | 2/2019 | Chandar et al. |

* cited by examiner

DIMENSIONAL COMPENSATIONS IN ADDITIVE MANUFACTURING

BACKGROUND

Additive manufacturing techniques may generate a three-dimensional object through the solidification of a build material, for example on a layer-by-layer basis. In examples of such techniques, build material may be supplied in a layer-wise manner and the solidification method may include heating the layers of build material to cause melting in selected regions. In other techniques, chemical solidification methods may be used.

BRIEF DESCRIPTION OF DRAWINGS

Non-limiting examples will now be described with reference to the accompanying drawings, in which.

DETAILED DESCRIPTION

Figure 1:
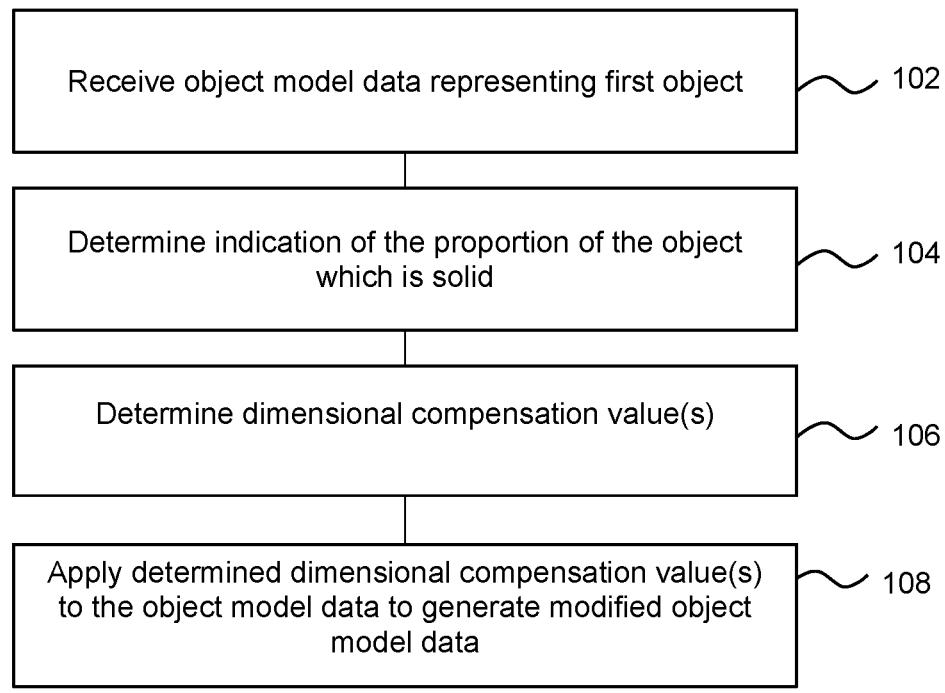
FIG. 1 is a flowchart of an example method of modifying object model data.

Additive manufacturing techniques may generate a three-dimensional object through the solidification of a build material. In some examples, the build material is a powder-like granular material, which may for example be a plastic, ceramic or metal powder and the properties of generated objects may depend on the type of build material and the type of solidification mechanism used. In some examples the powder may be formed from, or may include, short fibres that may, for example, have been cut into short lengths from long strands or threads of material. Build material may be deposited, for example on a print bed and processed layer by layer, for example within a fabrication chamber. According to one example, a suitable build material may be PA12 build material commercially referred to as V1R10A "HP PA12" available from HP Inc.

In some examples, selective solidification is achieved using heat in a thermal fusing additive manufacturing operation. This may comprise directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be derived (which may for example be derived from structural design data). The fusing agent may have a composition which absorbs energy such that, when energy (for example, heat) is applied to the layer, the build material heats up, coalesces and solidifies upon cooling, to form a slice of the three-dimensional object in accordance with the pattern. In other examples, coalescence may be achieved in some other manner.

According to one example, a suitable fusing agent may be an ink-type formulation comprising carbon black, such as, for example, the fusing agent formulation commercially referred to as V1Q60A "HP fusing agent" available from HP Inc. In one example such a fusing agent may comprise at least one of an infra-red light absorber, a near infra-red light absorber, a visible light absorber and a UV light absorber. Examples of print agents comprising visible light enhancers are dye based colored ink and pigment based colored ink, such as inks commercially referred to as CE039A and CE042A available from HP Inc.

In addition to a fusing agent, in some examples, a print agent may comprise a coalescence modifier agent, which acts to modify the effects of a fusing agent for example by reducing or increasing coalescence or to assist in producing a particular finish or appearance to an object, and such agents may therefore be termed detailing agents. In some examples, detailing agent may be used near edge surfaces of an object being printed, and/or may act to cool the build material or otherwise to reduce ease of solidification. According to one example, a suitable detailing agent may be a formulation commercially referred to as V1Q61A "HP detailing agent" available from HP Inc. A coloring agent, for example comprising a dye or colorant, may in some examples be used as a fusing agent or a coalescence modifier agent, and/or as a print agent to provide a particular color for the object.

Additive manufacturing systems may generate objects based on structural design data. This may involve a designer deriving a three-dimensional model of an object to be generated, for example using a computer aided design (CAD) application. The model may define the solid portions of the object. To generate a three-dimensional object from the model using an additive manufacturing system, the model data can be processed to derive slices of parallel planes of the model. Each slice may define a portion of a respective layer of build material that is to be solidified or caused to coalesce by the additive manufacturing system.

FIG. 1 is an example of a method, which may comprise a computer implemented method of modifying object model data.

The object model data may be modified to compensate for anticipated departures from intended dimensions when generating an object. In some examples, geometrical transformations may be used to modify object model data.

For example, in some additive manufacturing processes, where an object is generated in a process which includes heat, additional build material may adhere to the object on generation. In one example, fusing agent may be associated with a region of the layer which is intended to fuse. However, when energy is supplied, build material of neighbouring regions may become heated and fuse to the outside of the object (in some examples, being fully or partially melted, or adhering to melted build material as powder). Therefore, a dimension of an object may be larger than the regions to which fusing agent is applied. In order to compensate for this effect, i.e. where it is anticipated that an object may tend to 'grow' during manufacture in this manner, the object volume as described in object model data may be reduced to compensate for such growth.

In other examples, objects may be smaller following object generation than is specified in object model data. For example, some build materials used to generate objects may shrink on cooling. In order to compensate for this effect, i.e. where it is anticipated that an object may tend to 'shrink' following manufacture in this manner, the object volume as described in object model data may be reduced to compensate for such shrinkage.

A particular object may be subject to mechanisms which result in growth and/or shrinkage, and the optimal compensation to apply may be influenced by the different degrees by which an object may be affected by such processes.

The method comprises, in block 102, receiving, by at least one processor, object model data representing at least a portion of a first object that is to be generated by an additive manufacturing apparatus. In some examples, the object is to be generated by fusing build material within a fabrication chamber. In some examples, the fusing process may comprise a thermal fusing process in which heat is applied.

The object model data may comprise data representing at least a portion (in some examples, a slice) of an object to be generated by an additive manufacturing apparatus by fusing a build material. The object model data may for example comprise a Computer Aided Design (CAD) model, and/or may for example be a STereoLithographic (STL) data file. In some examples, the object model data may represent the object or object portion as a plurality of sub-volumes, wherein each sub-volume represents a region of the object which is individually addressable in object generation. In some examples herein, the sub-volumes may be referred to as voxels, i.e. three-dimensional pixels. The object model data may for example be received over a network or communications link, or from a memory which may be local to or remote from the at least one processor, or may be derived thereby.

The method further comprises, in block 104, determining, using at least one processor (which may be the same as the processor(s) referred to in relation to block 102), an indication of the proportion of the object which is solid (or which is intended to be solid once the object is generated). This may for example be any measure which indicates how much of the space occupied by the object is solid, and how much comprises empty space. For example, the space occupied by the object may be defined by its convex hull, and thus in some examples, and the indication of the proportion of the object which is solid may be an indication of the proportion of the space within the object's convex hull which is intended to be solid once the object is generated. For example, the object may be a solid cuboid, in which case the proportion of the object which is solid is 100%. However, the object may alternatively comprise a hollow cuboid or a mesh defining the edges of a cuboid. In such examples, the object is less than 100% solid.

The 'solidness', or conversely the 'hollowness', of the object may be related to the geometrical transformation which is appropriate to apply in additive manufacturing to compensate for deformation, for example as heating or cooling may be affected thereby.

The indication of the proportion of the object which is solid may be defined or determined in a number of ways, in some examples being determined based on an inspection of the object model data.

In some examples, the indication may comprise a ratio between a volume of the first object and a surface area value of the first object.

The volume of the first object and the surface area value used to determine the indication may themselves be defined or described in a number of ways. In some examples, the volume may be the volume enclosed by a mesh model of the object. In other examples, the volume may be determined in voxels from a voxel model of the object. Where the size of the voxels is predetermined and consistent (which may not be the case in all examples), the volume may be defined as a voxel count, or as the voxel count multiplied by the volume of each voxel.

In some examples, the surface area value is defined as the surface area of the convex hull of the object (as may be derived from object model data). In other examples, the surface area value is the sum of all exposed or external surfaces of the object/object model. Ratios of volumes to surface areas may be determined relatively simply without undue use of processing resources.

In other examples, an indication of the proportion of an object which is solid may for example comprise an indication of the proportion of solid to empty voxels in an object model, or within a convex hull of the object. In another example, wall thickness, for example average wall thickness, may be used to indicate the proportion of the object which is solid. In another example, a ratio of the solid volume to the volume of the convex hull may be used to indicate the proportion of the object which is solid.

Block 106 comprises determining, using at least one processor (which may be the same as the processor(s) referred to in relation to block 102 and/or 104), at least one dimensional compensation value to apply to the object model data representing the first object based (at least in part) on the indication of the proportion of the object which is solid.

In some examples, the dimensional compensation values may describe a parametrical transformation, for example a geometrical transformation such as at least one of an offset and a scaling factor. In some examples, a dimensional compensation may indicate up to three scaling factors (one for each of the three orthogonal axis) and up to three offset factors (one for each of the three orthogonal axis). By convention, this vertical dimension is usually referred to as the z axis in the context of additive manufacturing, with the x and y axes defining the plane of a layer, and this convention will be adopted herein.

A scaling factor may be used to multiply all specified dimensions in the direction of an axis by a value, which may be greater than 1 in order to increase the dimensions and less than 1 to reduce the dimensions. An offset factor may specify, for example by a specified distance (which may be specified in predefined units, for example addressable units such as pixels or voxels), an amount to add or remove from a surface of the object (or a perimeter within a layer).

In some examples, where scaling is not indicated in a given axis, the scaling factor in relation to that axis may be set to 1, and if no offset is indicated in a given axis, the offset factor in relation to that axis may be set to 0.

Block 108 comprises applying, using at least one processor (which may be the same as the processor(s) referred to in relation to block 102, 104 and/or 106), the determined dimensional compensation value(s) to the object model data to determine modified object model data. In some examples, the dimensional compensation value(s) may indicate at least one of a scaling factor and an offset factor. In some examples, where the object model data is described in terms of sub-volumes or voxels, such sub-volumes may be added or removed (or eroded). Where the object is, for example, described by a mesh model or the like, the mesh model may be adjusted, expanded or contracted as set out by the determined dimensional compensation value(s).

In other words, the method set out in FIG. 1 may comprise applying at least one compensation value which is based (at least in part) on a 'solidness' of the first object. This may be based on a mapping (for example, a look-up table, or an algorithm, or some other mapping) between the indication of the proportion of the object which is solid and dimensional compensation values.

It may be noted that other compensation values, which may be derived from other compensation models, may also be used to generate the modified object data, for example to compensate for other potential deformation mechanisms. For example, object location and/or proximity to other objects may be associated with deformations, and compensation parameters/values related to such deformations may be applied to the same object model data.

Figures 2A, 2B, 2C:
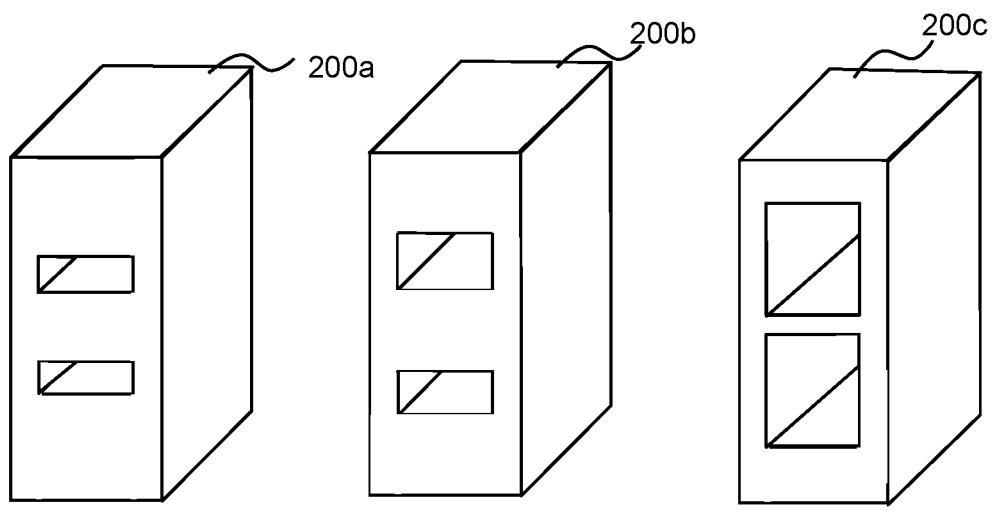
FIGS. 2A-2C show a schematic representation of different objects.

FIG. 2A-C are representations of a plurality of objects 200a, 200b, 200c showing different degrees of 'solidness' or 'hollowness' provided by cut-outs which extend through the objects 200. In this example, the objects 200 have the same major dimensions, i.e. the same maximum measurements of height, depth and width measurements.

In this example, the objects 200 are particularly suitable for use as calibration objects as the cut-outs provide convenient measurement points, for example for receiving measuring callipers or the like. The objects 200 are generally longitudinal, and thus could be generated in different orientations to provide an increased resolution in 'sampling' each axis by aligning the longitudinal axis of the objects 200 with the axis to be sampled (e.g. generated as shown to sample a vertical axis and rotated to emphasise changes in length in the x and y axes).

FIG. 2A shows an object 200a with relatively small cut-outs. FIG. 2B shows an object 200b with intermediate cut-outs and FIG. 2C shows an object 200c with relatively large cut-outs. In other words, the 'hollowness' of the object increases through the FIGS. 2A to 2C, and therefore these figures provide examples of objects having different solidness/hollowness.

The solid volume of the object 200a is greater than that of object 200b, which in turn is greater than that of object 200c. This may be expressed as:

$$Va > Vb > Vc$$

The surface area of the surfaces of the objects (SA(o)) themselves has the opposite trend, as more 'internal' surfaces of the objects 200 are exposed as the cut-outs increase in size:

$$SA(o)a < SA(o)b < SA(o)c$$

However, the surface area of the convex hull (SA(ch)) i.e. the smallest convex volume which encloses each object) of the objects 200 is the same, i.e. 2dw+2dh+2hw (where d is the depth, w is width and h is the height).

$$SA(ch)a = SA(ch)b = SA(ch)c$$

The indication of the proportion of the object which is solid of block 104 may in some examples be a ratio defined as:

$$\text{Ratio} = \frac{V}{SA(o)} \text{ or as Ratio} = \frac{V}{SA(ch)}$$

Both of these ratios provide a measure of 'solidness', and are relatively effective ways of characterising the proportion of the object which is solid without unduly consuming processing resources. The ratios may be thought of as expressing the relative density of the object in comparison with a volume of similar size which is completely solid (e.g. in the example above, a solid cuboid).

These ratios have been found to have a relationship with object deformation. Without wishing to be bound by theory, this may be due to how objects of different hollowness tend to accumulate and, perhaps particularly pertinently, lose heat. This in turn relates to how an object may contract during cooling. In particular, it has been noted that more solid/less hollow objects tend to contract more than less solid/more hollow objects, perhaps due to their slower rate of cooling. In addition, the heat generated in a very solid object during the object generation process may have a greater impact on build material around the object, creating some particular (characteristic) deviations in the object.

To compensate for this effect, the method of FIG. 1 proposes taking the indication of the proportion of the object which is solid, for example the ratio, into account when generating an object.

The relationship may be modelled by generating objects having different solid proportions (e.g. different ratios), and determining a relationship. In some examples, at least one function, or at least one parameter thereof, may be 'learnt' using machine learning techniques based on a training dataset. A relationship between dimensional inaccuracies of objects and the object 'hollowness' may be inferred from a training set including measurements of generated objects (which may have some of the features of the objects of FIG. 2A-C—for example being longitudinal and/or having well defined measuring points) and used to build the inference model.

For example, the training set may comprise data gathered from at least one additive manufacturing process, which may for example use the same class of additive manufacturing process (for example, all the processes may be carried out using selective laser sintering, or all the processes may be carried out using a fusing agent printed onto a layer of build material, or all the processes may be carried out using some other common additive manufacturing process). In other examples, all the processes may be carried out using a particular class of apparatus. In some examples, all the processes may be carried out using the same instance of an additive manufacturing apparatus (i.e. a particular 3D printer).

Dimensional compensation value(s) may be determined using curve fitting, machine learning and/or artificial intelligence techniques. In some examples, dimensional compensation value(s) may be derived, for example, by carrying out a data fitting and/or function approximation (e.g. by solving a "minimisation problem") for data interpolation operations on the training dataset.

In some examples, there may be a plurality of versions of dimensional compensation value(s), which may relate to different object generation parameter values. The object generation parameter(s) may be any parameter which may have an impact on dimensional inaccuracy. For example, the object generation parameter(s) may comprise any, or any combination of, environmental conditions, object generation apparatus, object generation material composition, object cooling profile, print mode or the like.

Figure 3:
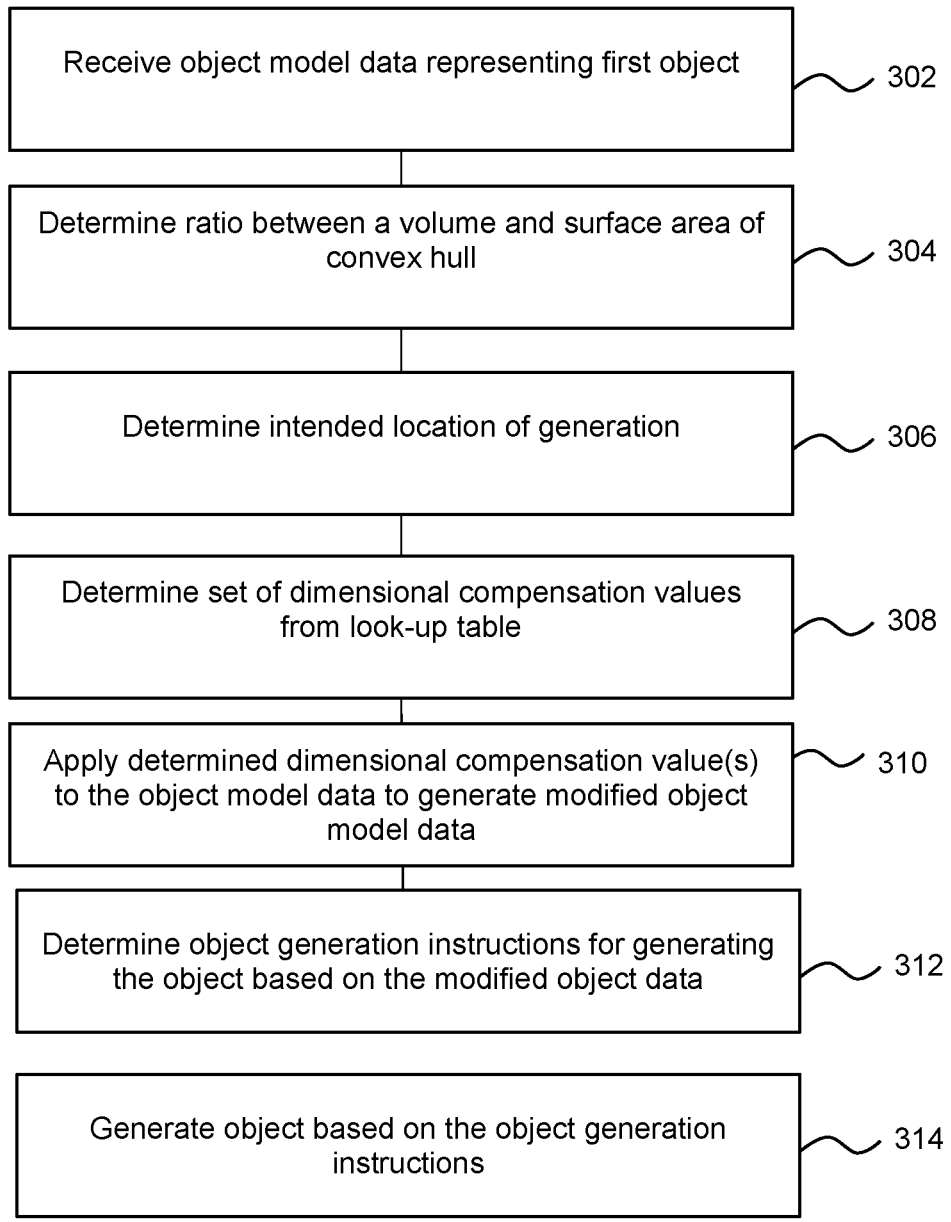
FIG. 3 is a flowchart of an example method of object generation.

FIG. 3 is an example of a method of generating an object, which may be at least in part a computer implemented method.

Block 302 comprises receiving, by at least one processor, object model data representing at least a portion of a first object that is to be generated by an additive manufacturing apparatus. This block may be carried out as described in relation to block 102 above.

Block 304 comprises determining, using at least one processor (which may be the same as the processor(s)

referred to in relation to block 302), a ratio between a volume of the first object and the surface area of the convex hull of the first object. This provides an example of an indication of the proportion of the object which is solid, and therefore provides an example of a method for carrying out block 104.

Block 306 comprises determining, using at least one processor (which may be the same as the processor(s) referred to in relation to block 302 and/or 304), an intended location of generation of the first object. For example, this may be determined based on a coordinate system. For example, a corner of the fabrication chamber may be designated as the origin and X, Y and Z offsets may be used to specify a location of an object. The location of the object when generated may, for example, be characterised as an indicative point location. For example, the location may be characterised as the coordinates of the centre of mass of the object when generated, or the volumetric centre of the object. In other examples, the indication may comprise an indication of the point on the object which is the closest to the origin in each axis, or may be defined by reference to an enclosing volume (e.g. a centre or a corner of a bounding box enclosing the object), or in some other way.

Block 308 comprises determining, using at least one processor (which may be the same as the processor(s) referred to in relation to block 302, 304 and/or 306), a set of dimensional compensation values, in this example comprising scaling and/or offset factors, each associated with one of the x, y and z axes, from a look-up table, which in this example is indexed using both location and the 'solidness' indicator ratio determined in block 304.

Block 310 comprises determining, using at least one processor (which may be the same as the processor(s) referred to in relation to block 302, 304, 306, and/or 308) modified object data by applying the determined dimensional compensation value(s) to the object model data, for example as described in relation to block 106 above.

Block 312 comprises determining, using at least one processor (which may be the same as the processor(s) referred to in relation to block 302, 304, 306, 308 and/or 310) object generation instructions (or 'print instructions') for generating the object based on the modified object data. The object generation instructions in some examples may specify an amount of print agent to be applied to each of a plurality of locations on a layer of build material. For example, determining object generation instructions may comprise determining 'slices' of a virtual fabrication chamber, and rasterising these slices into pixels (or voxels, i.e. three-dimensional pixels). An amount of print agent (or no print agent) may be associated with each of the pixels/voxels. For example, if a pixel relates to a region of a fabrication chamber which is intended to solidify, the object generation instructions may be determined to specify that fusing agent should be applied to a corresponding region of build material in object generation. If however a pixel relates to a region of the fabrication chamber which is intended to remain unsolidified, then object generation instructions may be determined to specify that no agent, or a coalescence modifying agent such as a detailing agent, may be applied thereto. In addition, the amounts of such agents may be specified in the determined instructions and these amounts may be determined based on, for example, thermal considerations and the like.

Block 314 comprises generating an object based on the object generation instructions. For example, such an object may be generated layer by layer. For example, this may comprise forming a layer of build material, applying print agents, for example through use of 'inkjet' liquid distribution technologies in locations specified in the object generation instructions for an object model slice corresponding to that layer using at least one print agent applicator, and applying energy, for example heat, to the layer. Some techniques allow for accurate placement of print agent on a build material, for example by using printheads operated according to inkjet principles of two dimensional printing to apply print agents, which in some examples may be controlled to apply print agents with a resolution of around 600 dpi, or 1200 dpi. A further layer of build material may then be formed and the process repeated, for example with the object generation instructions for the next slice.

In this way, by modifying the object model data to compensate for anticipated deformation associated with the object location and hollowness, the object once formed may end up being closer to an intended size.

While in this example, the modification to the data was made before object generation instructions were determined, this need not be the case in all examples, and in other examples object generation instructions may be determined then modified with compensation tranformations.

As mentioned above some examples, the methods set out herein may be combined with other methods of object model modification, which may include other object compensation models. However, there may be additional factors considered. For example, a modification function may be employed in the vicinity, or locality, of small features. An erosion of such small features may result in an unacceptable reduction in their size, either obliterating the feature or rendering it too small to fuse or too delicate to survive cleaning operations. For example, if a feature has a dimension of around 0.5 mm, this may correspond to 12 voxels at 600 dpi. If three or four voxels are eroded from the side of such a small feature, it will lose approximately 50 to 60% of its cross-section, reducing its size to less than 0.3 mm. Such a feature may be too small to survive cleaning operations. Thus, in some examples, other functions may be used to ensure that small features are preserved.

Figure 4:
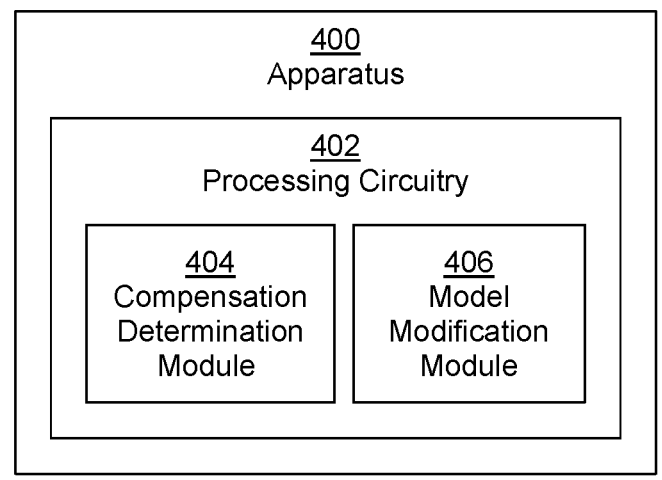
FIGS. 4 and 5 are simplified schematic drawings of example apparatus for additive manufacturing.

FIG. 4 shows an apparatus 400 comprising processing circuitry 402. The processing circuitry 402 comprises a compensation determination module 404, and a model modification module 406.

In use of the apparatus 400, the compensation determination module 404 determines a dimensional transformation for a virtual object representing a first object to be generated using additive manufacturing based (at least in part) on a measure of the proportion of the object which is solid. For example, the measure may comprise a ratio between a volume of the first object and a surface area value of the first object as described above. In some examples, the compensation determination module 404 may determine an indication of an intended location of object generation and to determine the dimensional transformation based at least in part on the intended location. For example, the compensation determination module 404 may utilise the methods described in relation to FIG. 1, 2 or 3 above.

In use of the apparatus 400, the model modification module 406 modifies the virtual object using the dimensional transformation. The dimensional transformation may comprise at least one scaling factor and/or at least one offset.

Figure 5:
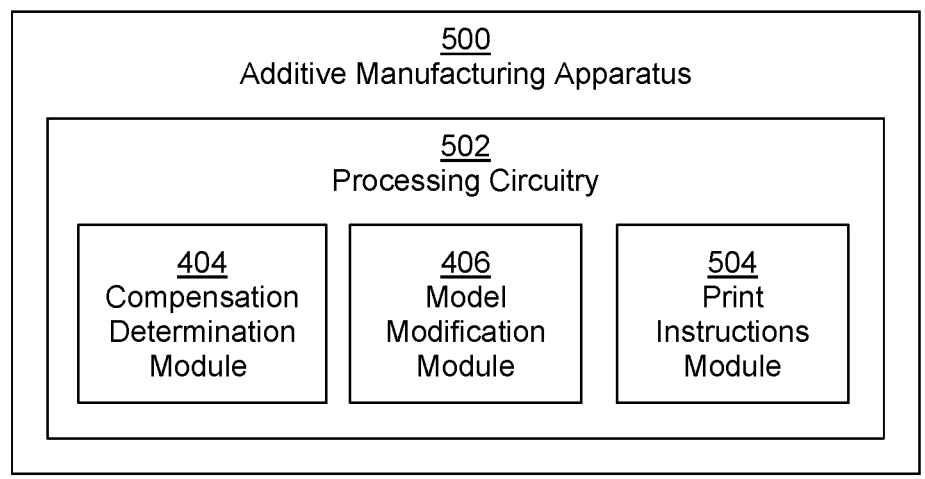

FIG. 5 shows additive manufacturing apparatus 500 to generate an object comprising processing circuitry 502. The processing circuitry 502 comprises the compensation determination module 404 and the model modification module 406 of FIG. 4 and further comprises a print instructions module 504.

The print instructions module 504, in use of the additive manufacturing apparatus 500, determines print instructions for generating the object from data representing the modified virtual object. The print instructions (or object generation instructions) may, in use thereof, control the additive manufacturing apparatus 500 to generate each of a plurality of layers of the object. This may for example comprise specifying area coverage(s) for print agents such as fusing agents, colorants, detailing agents and the like. In some examples, object generation parameters are associated with object model sub-volumes (voxels or pixels). In some examples, the print instructions comprise a print agent amount associated with sub-volumes. In some examples, halftoning may be applied to determine where to place fusing agent or the like. In some examples, other parameters, such as any, or any combination of heating temperatures, build material choices, an intent of the print mode, and the like, may be specified.

The additive manufacturing apparatus 500, in use thereof, generates the object in a plurality of layers (which may correspond to respective slices of an object model) according to the print instructions. The additive manufacturing apparatus 500 may for example generate an object in a layer-wise manner by selectively solidifying portions of layers of build material. The selective solidification may in some examples be achieved by selectively applying print agents, for example through use of 'inkjet' liquid distribution technologies, and applying energy, for example heat, to the layer. The additive manufacturing apparatus 500 may comprise additional components not shown herein, for example any or any combination of a fabrication chamber, a print bed, printhead(s) for distributing print agents, a build material distribution system for providing layers of build material, energy sources such as heat lamps and the like.

The processing circuitry 402, 502 or the modules thereof may carry out any or any combination of the blocks of FIG. 1, and/or any of blocks 302 to 310 of FIG. 3.

Figure 6:
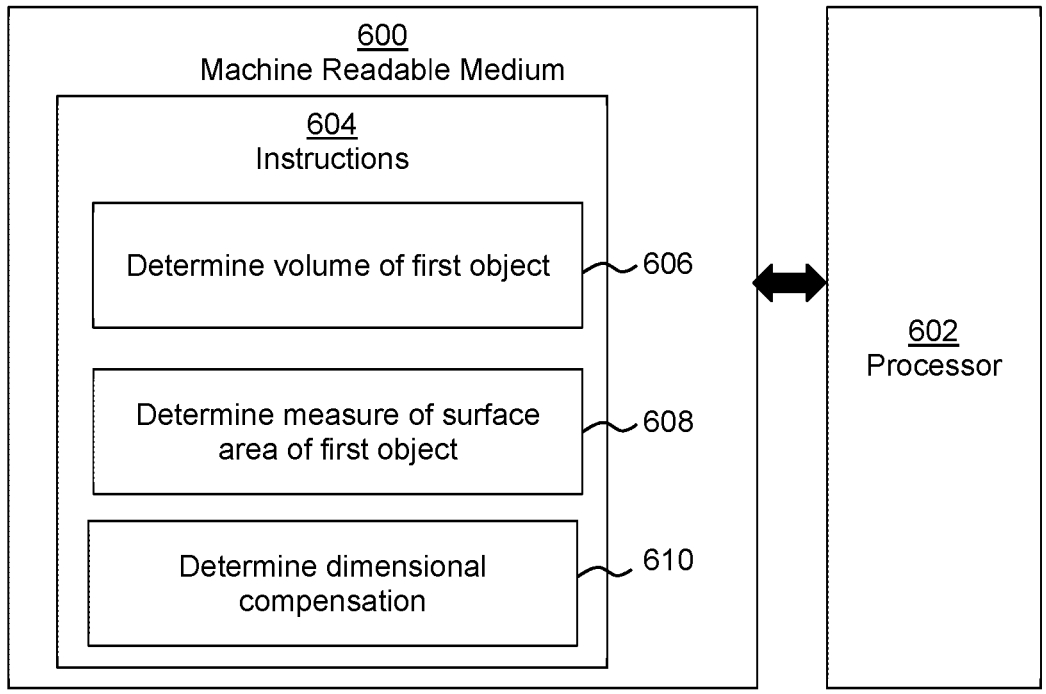
FIG. 6 is a simplified schematic drawing of an example machine-readable medium associated with a processor.

FIG. 6 shows a tangible machine-readable medium 600 associated with a processor 602. The machine-readable medium 600 comprises instructions 604 which, when executed by the processor 602, cause the processor 602 to carry out tasks. In this example, the instructions 604 comprise instructions 606 to cause the processor 602 to determine a volume of a first object to be generated using additive manufacturing, instructions 608 to cause the processor 602 to determine a measure of a surface area of the first object, and instructions 610 to cause the processor 602 to determine a dimensional compensation to apply to data representing the first object based on a ratio of the volume to the measure of surface area.

In some examples, the measure of surface area is a measure of the surface area of a convex hull of the first object. In some examples, the instructions 606 further comprise instructions to cause the processor 602 to apply the dimensional compensation to data representing the first object based on the ratio of the volume to the measure of surface area to determine modified data. In some examples, the instructions 604 further comprise instructions to cause the processor 602 to determine control instructions (for example, object generation instructions or print instructions as described above) for generating the first object based on the modified data.

In some examples, the instructions 604 when executed cause the processor 602 to carry out any or any combination of the blocks of FIG. 1, and/or any of blocks 302 to 310 of FIG. 3. In some examples, the instructions 604 may cause the processor 602 to act as any part of the processing circuitry 402, 502 of FIG. 4 or FIG. 5.

Figure 7A:
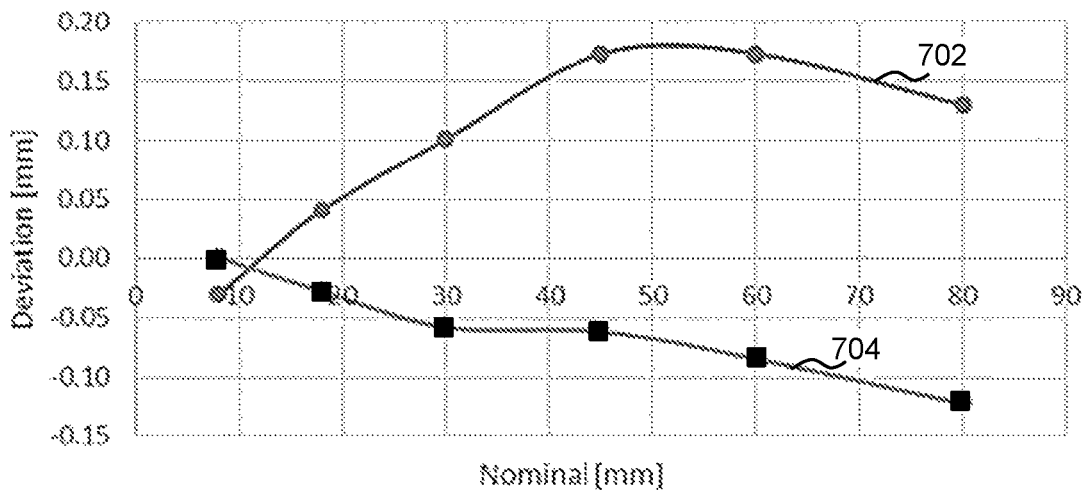
FIGS. 7A and 7B show examples of geometrical deviations seen in additive manufacturing.

FIG. 7A shows an example of the behaviour of different object types without compensation applied. Line 702 relates to an average deviation of relatively hollow objects and line 704 relates to an average deviation of relatively solid objects. The deviation in millimetres is plotted against an expected or nominal object measurement. In this example, a number of measurements acquired from each object, each of the measurements having a common origin and different nominal length associated with a measurement feature such as a cut-out or protrusion.

As can be seen more hollow objects (line 702) generally conform less accurately to expected dimensions, and tend to be larger than expected, whereas more solid objects tend to be smaller than expected. Without being bound by theory, this may be because more hollow objects can dissipate the heat faster than more solid/less hollow objects. As the contracting or shrinking process occurs during the cooling, the more hollow objects have less time to contract than other more solid/less hollow objects. The deviation tends to increase with length as the deviations are cumulative.

Based on measurements such as these (and in some examples, objects of other dimensions), the solidness/hollowness may be correlated with dimensional deviations, and a corresponding compensation may be determined, for example as a scaling factor and/or an offset.

Figure 7B:
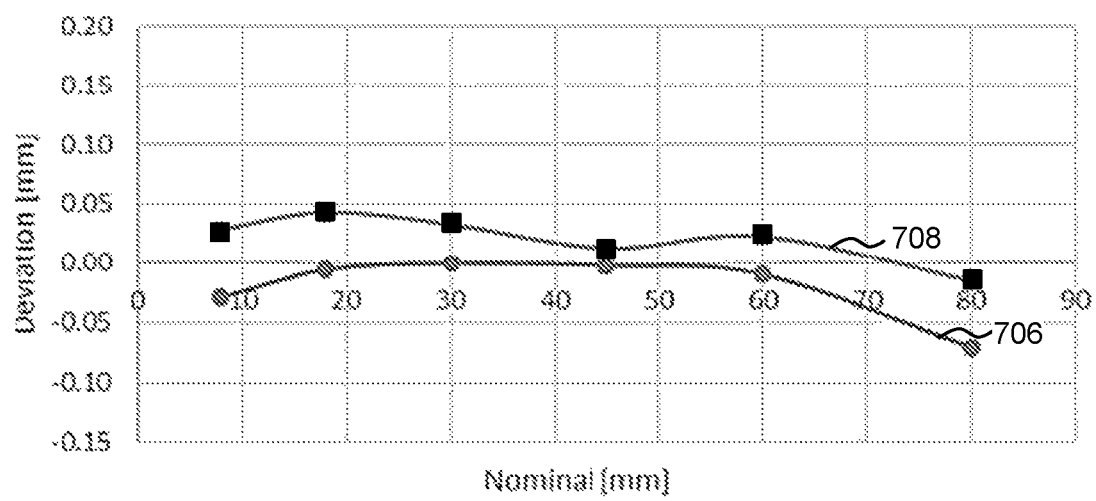

FIG. 7B shows the result of applying such a compensation. In this example, the compensation was derived from measurements obtained from one hundred calibration objects printed in a single build operation including four object subsets, each subset comprising 25 instances of a particular object (similar in form to the objects shown in FIG. 2, albeit having a greater number of cut-outs), the different subsets comprising objects of different hollowness. The compensation derived was one which, on average for each object type, corrected the dimensions of that object to match the intended dimensions in each axis.

To obtain the data shown in FIG. 7B, two subsets of objects were printed in a single build operation, with a total of 141 objects being printed. The first subset included multiple instances of the same relatively solid object and the second subset included multiple instances of the same relatively hollow object. The objects were printed in the same print apparatus as was used to print the calibration objects.

In this example, line 706 relates to an average deviation of relatively hollow objects and line 708 relates to an average deviation of relatively solid objects. As can be seen, for both object types, accuracy has been increased, although this is more marked for the relatively hollow objects The present disclosure can be provided as methods, systems or machine-readable instructions, such as any combination of software, hardware, firmware or the like. Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each block in the flow charts and/or block diagrams, as well as combinations of the blocks in the flow charts and/or block diagrams can be realized by machine-readable instructions.

The machine-readable instructions may, for example, be executed by a general purpose computer, a special purpose computer, an embedded processor or processors of other programmable data processing devices to realize the functions described in the description and diagrams. In particular, a processor or processing apparatus may execute the machine-readable instructions. Thus functional modules of the apparatus (such as the compensation determination module 404, the model modification module 406 and/or the print instructions module 504) may be implemented by a processor executing machine-readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine-readable instructions may also be stored in a computer readable storage that can guide the computer or other programmable data processing devices to operate in a specific mode.

Machine-readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
    receiving, by a processor, object model data representing an object to be generated by an additive manufacturing apparatus;
    determining, by the processor, an indication of a hollowness of the object;
    determining, by the processor, a dimensional compensation value to apply to the object model data based on the indication of the hollowness of the object;
    applying, by the processor, the dimensional compensation value to the object model data to generate modified object model data; and
    causing, by the processor, the additive manufacturing apparatus to generate the object in accordance with the modified object model data.

2. The method according to claim 1, wherein the indication of the hollowness comprises a ratio of a volume of the object to a surface area of the object.

3. The method according to claim 1, wherein determining the dimensional compensation value comprises retrieving the dimensional compensation value from a look-up table based on the indication of the hollowness of the object.

4. The method according to claim 1, wherein the dimensional compensation value comprises either or both of a scaling value and an offset value associated with at least one direction.

5. The method according to claim 1, wherein the dimensional compensation value is determined based on, in addition to the indication of the hollowness of the first object, an intended location at which the object is to be generated.

6. The method according to claim 1, further comprising determining, by the processor, object generation instructions for generating the object based on the modified object model data, the object generation instructions specifying an amount of print agent to be applied to each of a plurality of locations on a layer of build material.

7. The method according to claim 6, wherein the additive manufacturing apparatus is caused to generate the object in accordance with the object generation instructions.

8. A system comprising:
    a processor; and
    a memory storing program code executable by the processor to:
        receive object model data representing an object to be generated by an additive manufacturing apparatus;
        determine an indication of a hollowness of the object;
        determine a dimensional compensation value to apply to the object model data based on the indication of the hollowness of the object;
        apply the dimensional compensation value to the object model data to generate modified object model data; and
        cause the additive manufacturing apparatus to generate the object in accordance with the modified object model data.

9. The system according to claim 8, wherein the program code is executable by the processor to further determine an intended location at which the object is to be generated, and wherein the dimensional compensation value is further determined based on the intended location.

10. The system according to claim 8, wherein the program code is executable by the processor to further
    determine print instructions for generating the object based on the modified object model data.

11. The system according to claim 10, wherein the additive manufacturing apparatus is caused to generate the object in accordance with the print instructions.

12. A non-transitory machine-readable medium storing instructions executable by a processor to perform processing comprising:
    receiving object model data representing an object to be generated by an additive manufacturing apparatus;
    determining an indication of a hollowness of the object;
    determining a dimensional compensation value to apply to the object model data based on the indication of the hollowness of the object;

applying the dimensional compensation value to the object model data to generate modified object model data; and causing the additive manufacturing apparatus to generate the object in accordance with the modified object model data.

13. The non-transitory machine-readable medium according to claim 12, wherein the indication of the hollowness comprises a ratio of a volume of the object to a surface area of a convex hull of the object.

14. The non-transitory machine-readable medium according to claim 12, wherein the processing further comprises determining printing instructions for generating the object based on the modified object model data.

15. The non-transitory machine-readable medium according to claim 14, wherein the additive manufacturing apparatus is caused to generate the object in accordance with the print instructions.

* * * * *